United States Patent
Saugrain et al.

(10) Patent No.: US 10,121,568 B2
(45) Date of Patent: Nov. 6, 2018

(54) ELECTRICITY TRANSMISSION CABLE WITH MASS-IMPREGNATED PAPER INSULATION

(71) Applicant: NEXANS, Paris (FR)

(72) Inventors: Jean-Maxime Saugrain, Le Vesinet (FR); Pierre Kayoun, Boulogne Billancourt (FR); Pierre Mirebeau, Villebon sur Yvette (FR)

(73) Assignee: NEXANS, Courbevoie (FR)

( * ) Notice: Subject to any disclaimer, the term of this patent is extended or adjusted under 35 U.S.C. 154(b) by 11 days.

(21) Appl. No.: 15/311,351

(22) PCT Filed: Apr. 22, 2015

(86) PCT No.: PCT/FR2015/051092
§ 371 (c)(1),
(2) Date: Dec. 21, 2016

(87) PCT Pub. No.: WO2015/173486
PCT Pub. Date: Nov. 19, 2015

(65) Prior Publication Data
US 2017/0207003 A1    Jul. 20, 2017

(30) Foreign Application Priority Data
May 16, 2014    (FR) ...................................... 14 54375

(51) Int. Cl.
*H01B 7/00*    (2006.01)
*H01B 7/02*    (2006.01)
(Continued)

(52) U.S. Cl.
CPC ................. *H01B 7/02* (2013.01); *H01B 7/14* (2013.01); *H01B 7/2825* (2013.01)

(58) Field of Classification Search
CPC ... H01B 3/02; H01B 3/04; H01B 5/02; H01B 5/04; H01B 7/02; H01B 9/02
(Continued)

(56) References Cited

U.S. PATENT DOCUMENTS 3,748,372 A * 7/1973 McMahon ............... H01B 3/20
174/102 C
4,767,182 A * 8/1988 Parfree ................ G02B 6/4427
385/107
(Continued)

FOREIGN PATENT DOCUMENTS

DE    904301    * 3/1954    ............... H01B 9/02
DE    2345743    3/1975
(Continued)

OTHER PUBLICATIONS

Search Report dated Jul. 20, 2015.
Search Report dated Jan. 27, 2015.

*Primary Examiner* — William H Mayo, III
(74) *Attorney, Agent, or Firm* — Sofer & Haroun, LLP

(57) ABSTRACT

An electricity transmission cable with mass-impregnated paper insulation has around at least one conductor (1), an impregnated paper layer (2) and a metal layer (3) adjacent to the impregnated paper layer, this metal layer (3) consisting of copper or aluminum. The cable has, directly around said metal layer (3), an insulating material layer (4) and, directly around the insulating material layer (4), a transverse reinforcement layer (5) made of steel or made of glass fiber tape.

8 Claims, 1 Drawing Sheet

(51) Int. Cl.
*H01B 7/14* (2006.01)
*H01B 7/282* (2006.01)

(58) Field of Classification Search
USPC ....... 174/102 R, 103, 106 R, 106 SC, 110 R, 174/113 R, 126.1, 126.2
See application file for complete search history.

(56) References Cited

U.S. PATENT DOCUMENTS

| | | | | |
|---|---|---|---|---|
| 4,967,039 | A * | 10/1990 | Mohan | H01B 3/465 |
| | | | | 174/25 C |
| 9,431,153 | B2 * | 8/2016 | Maioli | H01B 7/26 |
| 2001/0042635 | A1 | 11/2001 | Kondo et al. | |
| 2004/0255452 | A1 * | 12/2004 | Schippl | H01B 12/02 |
| | | | | 29/599 |
| 2010/0099571 | A1 * | 4/2010 | Usoskin | H01B 12/06 |
| | | | | 505/230 |
| 2011/0048765 | A1 | 3/2011 | Eggertsen et al. | |

FOREIGN PATENT DOCUMENTS

| | | | | |
|---|---|---|---|---|
| GB | 547470 | | 8/1942 | |
| GB | 1133455 | * | 11/1968 | ............... H01B 9/02 |
| GB | 1191782 | | 5/1970 | |
| WO | 2014040637 | | 3/2014 | |

\* cited by examiner

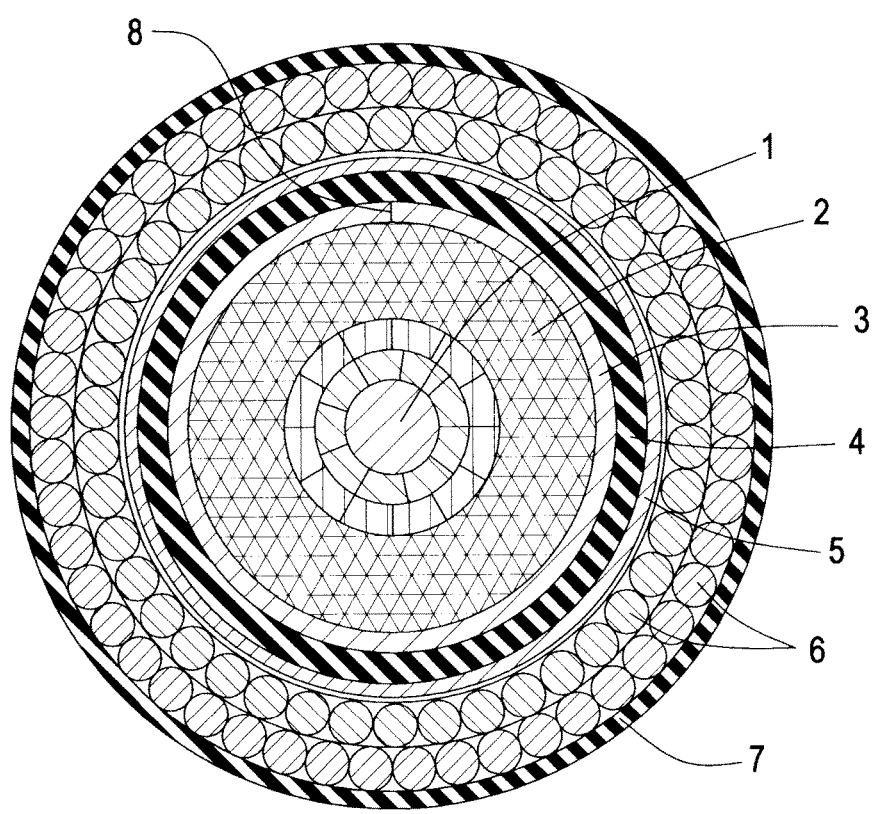

ELECTRICITY TRANSMISSION CABLE WITH MASS-IMPREGNATED PAPER INSULATION

RELATED APPLICATIONS

This application is a National Phase Application of PCT/FR2015/051092 filed on Apr. 22, 2015, which in turn claims the benefit of French Patent Application No. 14 54375 filed on May 16, 2014.

BACKGROUND

Field of the Invention

The invention relates to an electricity transmission cable with mass-impregnated paper insulation.

DESCRIPTION OF RELATED ART

Paper-insulated cables with a lead sheath are used for energy distribution and for industrial uses. They are installed exposed, in underground pipes or are directly buried in the ground and are also used in submarine applications.

Papers of various thicknesses ranging from 50 to 200 μm, with a density of 650 to 1000 kg/m$^3$, are used. Given that the intrinsic density of the fibres is of the order of 1500 kg/m$^3$, the free space between them should be filled with impregnating elements that impregnate with a sort of wax referred to as "mass". The latter has the advantageous property of being fluid at a temperature of 120° C. which gives it excellent impregnation properties, and of being converted, up to the maximum operating temperature, into a highly viscous mass.

It is also possible, as a variant, to use, instead of paper, a paper complex of laminated polypropylene and paper.

In order to prevent water infiltration, an extruded lead alloy sheath having a thickness of greater than 2.5 mm is applied around the impregnated paper insulation which has, itself, a thickness of between 15 and 20 mm. An external sheath may be made of PVC or of PE. Depending on the use of the cable, a longitudinal armour may also be installed.

This type of cable referred to as having "mass-impregnated paper insulation" is very suitable for great underground or submarine depths.

Under DC voltage, the activity in the cavities and other defects that appear in the paper is reduced and this makes it possible to use mass-impregnated paper cables even for high voltages.

That being said, lead is relatively heavy, which is prejudicial to the use of such submarine cables and it constitutes a risk for the environment and the health of populations, particularly during the use of such land cables.

Patent documents DE 904 301 and GB 1 191 782 describe an electricity transmission cable with mass-impregnated paper insulation comprising around at least one conductor, an impregnated paper layer and a metal layer adjacent to said impregnated paper layer, this metal layer consisting of aluminium.

Patent document GB 547 470 describes an electricity transmission cable with mass-impregnated paper insulation comprising around at least one conductor, an impregnated paper layer and a metal layer adjacent to said impregnated paper layer, this metal layer consisting of copper.

Objects and Summary

The invention proposes an improvement to this type of cable and, with this aim in mind, it relates to an electricity transmission cable with mass-impregnated paper insulation comprising around at least one conductor, an impregnated paper layer and a metal layer adjacent to said impregnated paper layer, this metal layer consisting of copper or aluminium, characterized in that it comprises, directly around said metal layer, an insulating material layer and, directly around said insulating material layer, a transverse reinforcement layer made of steel or made of glass fibre tape.

Due to their ductility, annealed copper of electrical type and pure aluminium may advantageously replace lead, following modifications of volume of the impregnated paper layer according to the temperatures.

The transverse reinforcement layer provides a spring effect due to its elasticity, in order to reinforce the mechanical strength during the expansion or contraction of the impregnated paper layer.

According to one preferred embodiment, said insulating material layer is laminated to said metal layer.

A rapid fatigue of said welded strip is thus avoided.

Preferably, said metal layer has a thickness between 0.6 and 1.5 mm.

Besides the fact that copper and aluminium have a lower density than lead, it turns out that the thickness of the copper or aluminium layer may be considerably smaller than that of a known lead layer. This results in a considerable weight saving of the order of 10 kg per linear meter of cable.

According to one embodiment, said layer consists of a strip wound in the form of a cylinder around said conductor and welded longitudinally.

Preferably, said strip is welded along a generatrix of said cylinder.

Preferably, said insulating material layer is made of polyethylene laminated by means of a polyolefin layer to said metal layer.

Advantageously, said transverse reinforcement layer has a thickness between 0.1 and 1 mm.

Such a cable is preferably intended for DC high voltages.

BRIEF DESCRIPTION OF THE DRAWINGS

The invention is described below in greater detail with the aid of a FIGURE that represents only one preferred embodiment of the invention.

This FIGURE is a cross-sectional view of a cable in accordance with the invention, particularly intended for submarine use.

DETAILED DESCRIPTION

An electricity transmission cable with mass-impregnated paper insulation, particularly intended for submarine use, comprises around at least one conductor 1, here consisting of a central cylindrical conductor and conductors of trapezoidal cross section, an impregnated paper insulation system 2 consisting of internal semi-conductive papers, insulating papers and external semi-conductive papers, and a metal layer 3.

Around this metal layer 3, it also comprises an insulating material layer 4, preferably made of high-density polyethylene and having a thickness of 3 to 6 mm, laminated to the metal layer 3, a transverse reinforcement layer 5, having a yield strength of between 20×10$^6$ N and 100×10$^6$ N per meter of cable length, and an external sheath 7.

This transverse reinforcement layer 5, having a thickness between 0.1 and 1 mm, has a tensile modulus greater than that of the metal layer 3 and an elastic domain such that it is capable of absorbing the variations in volume of the insulating mass in the operating range of the cable at temperature, and also handling stresses, for example coiling stresses.

This transverse reinforcement layer 5 is preferably made of steel and is taped over the insulating material layer 4. It preferably has a thickness substantially equal to 0.2 mm.

Advantageously, a 400 MPa to 700 MPa steel is selected.

The reinforcement layer may also be made of R-glass or S-glass fibre tape and have a thickness substantially equal to 1 mm.

The lamination of the insulating material layer 4 is carried out by a thin layer of functionalized polymer, preferably polyolefin, comprising pendant polar groups, which is co-extruded with the insulating material layer 4.

In the case of a submarine application, a pull-resistant armour consisting of longitudinal metal wires 6, preferably made of steel, is also arranged.

This metal layer 3 surrounding the impregnated paper layer consists of copper or aluminium and has a thickness of between 0.6 and 1.5 mm.

This metal layer consists of a strip wound in the form of a cylinder around the conductor 1 and welded longitudinally along a generatrix of the cylinder, by a weld seam 8 produced by laser or TIG (tungsten inert gas) welding.

Such a cable is intended for DC high voltages.

The invention claimed is:

1. Electricity transmission cable with mass-impregnated paper insulation comprising
   around at least one conductor, an impregnated paper layer and a metal layer adjacent to said impregnated paper layer, this metal layer consisting of copper or aluminum,
   wherein said electricity transmission cable has, directly around said metal layer, an insulating material layer and, directly around said insulating material layer, a transverse reinforcement layer made of steel or made of glass fibre tape.

2. Cable according to claim 1, said insulating material layer is laminated to said metal layer.

3. Cable according to claim 1, said metal layer has a thickness between 0.6 and 1.5 mm.

4. Cable according to claim 1, said metal layer is made of a strip wound in the form of a cylinder around said conductor and welded longitudinally.

5. Cable according to the preceding claim 1, wherein said strip is welded along a generatrix of said cylinder.

6. Cable according to claim 1, wherein said insulating material layer is made of polyethylene laminated by means of a polyolefin layer to said metal layer.

7. Cable according to claim 1, wherein said transverse reinforcement layer has a thickness between 0.1 and 1 mm.

8. Cable according to claim 1, intended for DC high voltages.

* * * * *